Dec. 10, 1968   R. F. BROWN ETAL   3,415,735
APPARATUS FOR REMOVING CONTAMINANTS FROM HIGH-RESISTIVITY FLUIDS
Filed Sept. 23, 1964   3 Sheets-Sheet 1

INVENTORS
ROBERT F. BROWN
HERBERT J. HALL

BY *Stowell & Stowell*

ATTORNEYS

Dec. 10, 1968   R. F. BROWN ET AL   3,415,735
APPARATUS FOR REMOVING CONTAMINANTS FROM HIGH-RESISTIVITY FLUIDS
Filed Sept. 23, 1964   3 Sheets-Sheet 2

INVENTORS
ROBERT F. BROWN
HERBERT J. HALL

BY *Stowell & Stowell*
ATTORNEYS

INVENTORS
ROBERT F. BROWN
HERBERT J. HALL

BY *Stowell & Stowell*

ATTORNEYS

United States Patent Office 3,415,735
Patented Dec. 10, 1968

3,415,735
APPARATUS FOR REMOVING CONTAMINANTS
FROM HIGH-RESISTIVITY FLUIDS
Robert F. Brown, Piscataway Township, and Herbert J. Hall, Skillman, N.J., assignors to Research-Cottrell, Inc., Bridgewater Township, N.J., a corporation of New Jersey
Filed Sept. 23, 1964, Ser. No. 398,592
6 Claims. (Cl. 204—302)

ABSTRACT OF THE DISCLOSURE

An electrostatic device for the removal of contaminants from high-resistivity liquids such as petroleum based oils. A porous matrix affixed to the discharge electrode is employed to collect contaminants. A tortuous path is generally provided for the liquid.

---

This invention relates to apparatus for the removal of particulate and liquid contaminants from generally non-conductive or high-resistivity fluids by means of electrostatic fields.

It is frequently desirable and important to remove liquid and particulate contaminants from high-resistivity fluids and liquids, particularly insulating fluids such as petroleum based oils and the like. This has been found to be quite difficult from a practical standpoint with filters of the kind wherein the fluid to be decontaminated passes through the filter media, and it is characteristic of such filters that they shortly become clogged with solid materials, thus rendering the filter elements useless or at least of substantially reduced efficiency. At the same time, it is highly desirable to remove contaminating matter from such liquids in a continuous operation, that is, while the liquid flows continuously through the apparatus used for separating the contaminants from the liquid.

An important object of the present invention is to provide a novel electrostatic system for driving contaminants which may be organic, inorganic, conductive, non-conductive, solid or immiscible liquids or mixtures thereof from a high-resistivity fluid to be cleaned rapidly and thoroughly into a matrix where they are held by entrapment in pores and by the pressure of the electrostatic field.

A further object is to provide high voltage electric fields to accomplish the results stated while the oil or other high-resistivity liquid flows through the fields.

A further object is to provide such a system wherein high voltage electrodes impress very high electrostatic fields upon contaminants in the liquid to be cleaned and the particulate or liquid contaminants acquire electric charges and are driven into a porous non-conducting collecting medium.

A further object of the present invention is to provide such apparatus wherein the contaminant receiving matrix is connected to the high voltage conductor and the complementary electrode of the system is at ground potential.

A further object is to provide an apparatus including means permitting heating of high-resistivity liquids with very high viscosities, thereby substantially improving the cleaning efficiency of the apparatus.

It is a further object to provide apparatus which will not only decontaminate high-resistivity fluids but also fluids having resistivities in the order of $10^9$ to $10^{11}$ ohm-cm.

A further object is to provide apparatus of the general type described wherein the non-matrix electrode may comprise a rod, a tube, a fine wire, a serrated tube or a disc or plate which may have serratures or projections thereon.

A further object is to provide a low pressure drop collector which will remove fine particles in the range 0 to $5\mu$.

A further object is to provide simple and relatively light-weight high-resistivity fluid decontaminating apparatus particularly suited for both stationary and mobile installations. For example, the improved apparatus may comprise a portion of a packaging line for lubricating oil with the oil passing through the decontaminator prior to being sealed in containers. The assembly may also be mounted on an oil dispensing vehicle at air fields or the novel decontaminating apparatus may be mounted on its own wheeled frame and form a portion of a mobile fluid dispensing system.

Other objects and advantages of the invention will become apparent during the course of the following description.

In the drawings there are shown several embodiments of the invention wherein.

Throughout the specification and claims, the term "particulate contaminants" includes inorganic, organic, conductive and non-conductive solid particles and liquids immiscible in the high-resistivity fluid to be cleaned by the apparatus of the invention.

The term "non-conductive liquids" means liquids having resistivities of about $10^{11}$ ohm-cm. and above and the term "high-resistivity liquids" means liquids having resistivities of about $10^9$ ohm-cm. and above.

Figure 1:
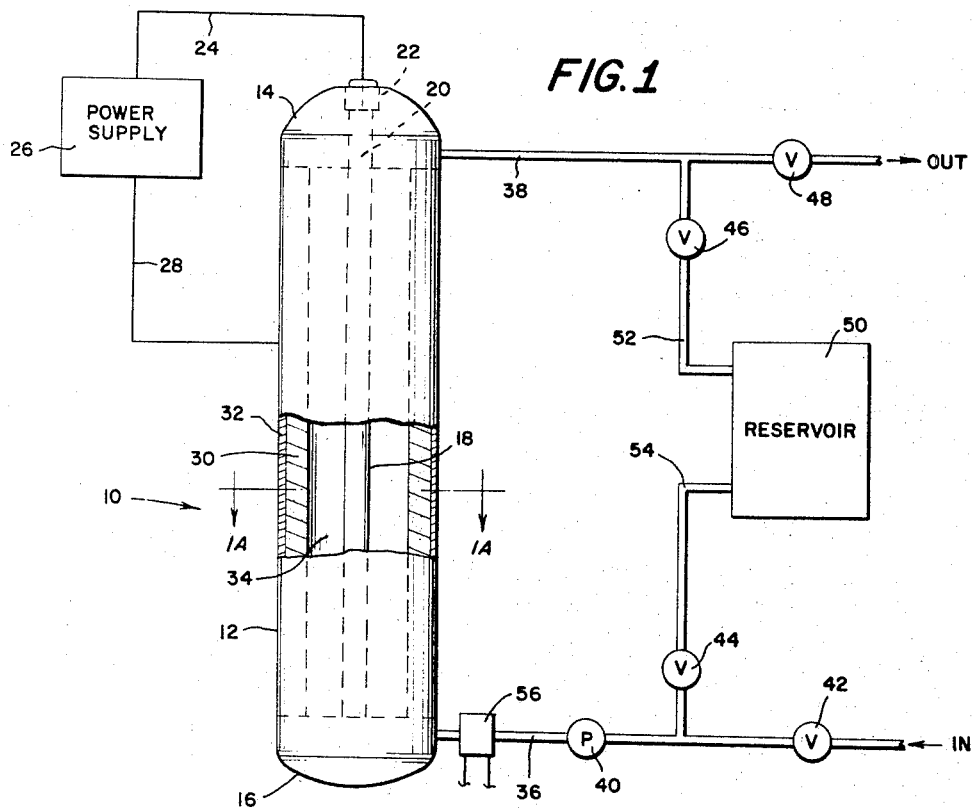
FIG. 1 is a schematic partial sectional view illustrating a basic system of the fluid cleaning apparatus of the invention.
Figure 1A:
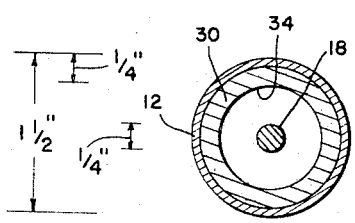
FIG. 1A is a section substantially on line 1A—1A of FIG. 1.

Referring to FIGS. 1 and 1A, 10 generally designates apparatus suitable for decontaminating non-conductive liquids and includes an elongated casing 12 having a top 14 and a bottom 16. Extending axially through the casing is a rod-like or tubular electrode 18, the bottom end of which terminates short of the bottom 16 of the casing 12 to provide electrical clearance between the electrode 18 and the bottom of the casing 12. The upper end 20 of the electrode 18 is supported from the top of the casing 12 by a suitable insulating bushing 22 and the upper end 20 of the electrode 18 is connected to an electrical conductor 24 which in turn is connected to one terminal of a power supply 26. The other electrical terminal of the power supply 26 is connected to the conductive casing 12 by electrical conductor 28.

Positioned within the casing 12 and generally coextensive with the electrode 18 is a porous matrix 30 having an annular configuration in transverse cross-section. The outer surface 32 of the annular matrix 30 is in electrical contact with the inner wall of the casing 12 while the inner surface 34 of the matrix 30 is in spaced relationship to the rod electrode 18 as more clearly illustrated in FIG. 1A of the drawings.

The liquid to be cleaned enters the casing 12 via a conduit 36 which is connected to the casing adjacent the lower head 16 below the lower ends of the matrix 30 and the electrode 18. The decontaminated liquid is removed from the casing 12 via conduit 38 which projects into the casing 12 above the upper end of the matrix 30. A pump 40 and suitable valves 42, 44, 46 and 48 together with reservoir 50 and cross lines 52 and 54 may be provided in the fluid circulatory system whereby the liquid to be cleaned may be passed through the cleaning apparatus by opening valves 42 and 48 and closing valves 44 and 46 or all or a portion of the fluid to be treated may be passed, a plurality of times, through the cleaning apparatus by closing valves 42 and 48 either entirely or partially and opening valves 44 and 46 in cross lines 52 and 54.

In operation of this form of the invention, the dirty generally non-conductive fluid, such as an oil or the like, containing particulate contaminants and/or electrically conductive immiscible liquids, such as water, is passed through the apparatus while the electrode 18 and the matrix 30 are energized by the power supply 26. Under the influence of the high voltage electricity created between the electrode 18 and the wall of the casing 12, the contaminating matter is driven from the fluid into the matrix 30.

The contaminating materials are primarily driven into the non-conducting matrix by virtue of the turbulent mixing of the fluid due to the highly divergent electric field maintained in the apparatus and are held in the non-conducting matrix by the charge induced on the particulate contaminating matter. Thus, two principal forces are cooperating in the particulate removing process: turbulent flow of liquid and electric field forces, both projecting the particles through the liquid into the matrix. The synergistic effect of the high electric field strength and turbulence in cooperation with the matrix medium provides the efficient cleaning of the system.

The particular material employed in constructing the matrix 30 is generally optional as long as the material is porous and not soluble in the fluids being treated; for example, tests have been made using a cotton, gauze-like pad, polyurethane foam and materials such as glass fibers, sintered ceramics, etc. Supercleaning of the fluid and extremely high performance can be obtained with relatively small size equipment requiring a very low pressure drop between the inlet and outlet and with negligible electrical power consumption. Unipass removal efficiency of at least 99% can be readily achieved on +5 micron particles (fines below 5 microns are similarly removed as has been determined by silting indices). Effective removal of particles typically occurs in the 0 to 100 micron range and the apparatus is operative with substantial differences in temperatures and pressures. For example, where the fluid to be decontaminated has a high viscosity which would normally cause poor performance in the described apparatus, a heater such as illustrated at 56 could be employed in the system whereby the viscosity of the material to be treated could be lowered by increasing the temperature thereof during its passage through the decontaminator.

Referring again to the type of material suitable for the matrix 30, materials such as polyethylene foam, cotton, glass fiber batts and the like, have been found to be particularly useful as under the impact of the particles being driven from the fluid to be decontaminated the pores of the material are opened and expanded, thus allowing additional particles to be deposited within the entrapping medium.

Very satisfactory decontamination of high-resistivity fluids has been accomplished with apparatus wherein the diameter of the rod or tubular electrode 18 is in the order of about ¼ inch in diameter; the matrix 30 has an outside diameter of about 1½ inches and an inside diameter of about 1 inch and when electric fields are impressed across the electrodes corresponding to, for example, about 20 to about 60 kv./inch.

As disclosed in copending application Ser. No. 369,689, Herbert J. Hall, "Method and Apparatus for Removing Contaminants From High-Resistivity Fluids," filed May 25, 1964, now abandoned, negative polarity high voltage D.C. energization of the non-porous electrode generally provides satisfactory results while the use of alternating current and pulse energization of the electrodes of the system may be employed. It has now been found that liquids with electrical resistivities in the range of $1-2 \times 10^{10}$ ohms per centimeter and less were not adequately cleaned of particulate contaminants when the electrodes of the system were connected to the source of energizing direct current in the conventional manner, that is, when the matrix was connected to the grounded terminal. Liquid cleaning of liquids having electrical resistivities in the range of $1-2 \times 10^{10}$ ohms per centimeter is satisfactorily accomplished when the porous matrix is connected to the high voltage terminal rather than the grounded terminal of the power source.

Whether the high potential electrode is negative or positive with respect to ground appears to be of small consequence as far as the basic operation of the liquid cleaners is concerned. Substantially the only difference is that more stable electrical operation may be experienced if the high potential electrode is negative with respect to ground potential.

While the apparatus illustrated in FIGS. 1 and 1A comprises a single rod-type electrode 18 and a single annular matrix 30 maintained within the housing 12, it will be appreciated by those skilled in the art that the casing 12 may be enlarged to accommodate a plurality of parallelly arranged annular matrix elements 30, each of which is provided with a rod-type electrode 18 thereby substantially increasing the capacity of the unit. It will also be appreciated that where a plurality of the units are maintained in a single housing, suitable baffles and/or partitions and the like may be employed whereby a portion of the units are connected in parallel while other of the units are connected in series to provide for two-stage decontamination of the liquids flowing therethrough.

Figure 2:
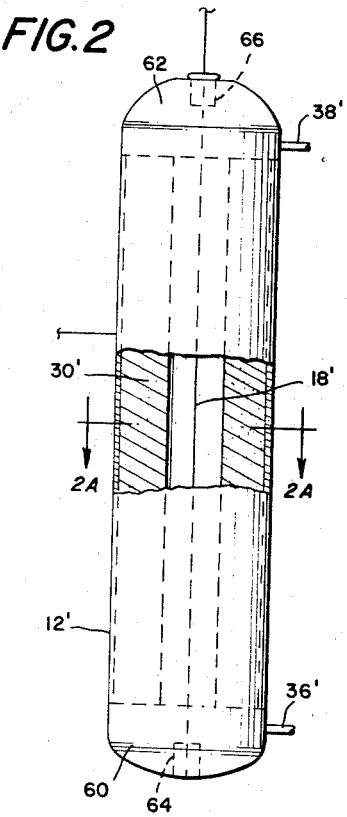
FIG. 2 is a diagrammatic partial sectional view of another form of the fluid cleaning apparatus of the invention.
Figure 2A:
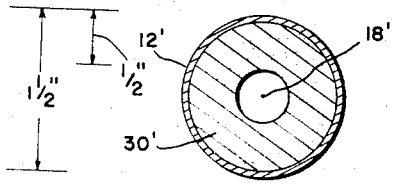
FIG. 2A is a section on line 2A—2A of FIG. 2.

Referring to FIGS. 2 and 2A, a modified form of the apparatus of the invention is illustrated wherein the apparatus includes a casing 12' which may be constructed as disclosed with reference to FIGS. 1 and 1A of the drawings. Within the casing 12' is mounted an annular porous matrix member 30' having an outer cylindrical surface in contact with the inner conductive surface of the casing 12'. Within the upper and lower chambers 60 and 62 of the casing are mounted electrical insulators 64 and 66 between which is mounted a fine wire electrode 18'. The upper end of the fine wire electrode 18' is connected to the grounded terminal of a suitable source of energizing current while the casing 12' is connected to the high voltage terminal of said source of electric power. In this form of the invention where a fine wire electrode is employed, suitable dimensions for the apparatus are as follows: outer diameter of the porous matrix 30'—1½ inches; inner diameter of the porous matrix 30'—½ inch; fine wire diameter—10 mils. Liquid is directed to and from the casing via conduits 36' and 38'.

As discussed with reference as to the form of the invention illustrated in FIGS. 1 and 1A, a plurality of the units illustrated in FIGS. 2 and 2A may be mounted in a single housing for parallel and/or serial flow of the liquid to be decontaminated.

Figure 3:
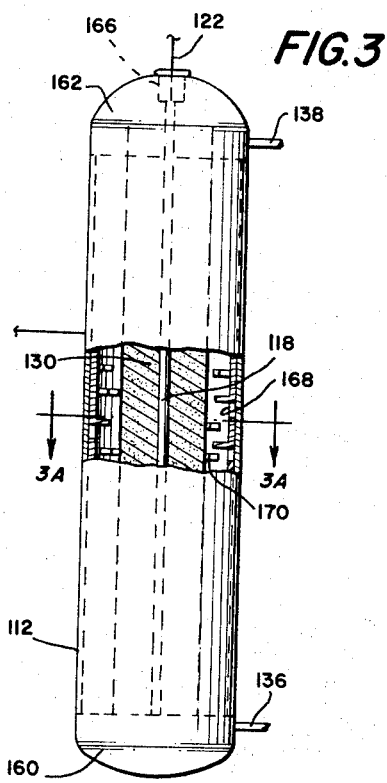
FIG. 3 is a diagrammatic partial sectional view of a further form of the apparatus of the invention.
Figure 3A:
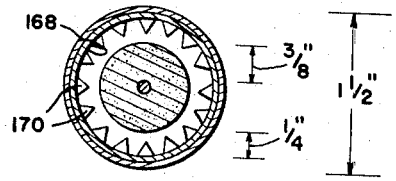
FIG. 3A is a section on line 3A—3A of FIG. 3.

Referring to FIGS. 3 and 3A of the drawings, centrally mounted within the electrically conductive casing 112 is a rod 118 suspended from an insulating bushing 166 mounted in the upper end of the casing 112. The rod 118 supports an annular porous matrix member 130 between the lower and upper plenum chambers 160 and 162. Like the other forms of the invention, an inlet conduit 136 is provided adjacent the lower plenum chamber 160 and an outlet conduit 138 is provided adjacent the upper plenum chamber 162 whereby the fluid to be treated may be directed through the decontaminating apparatus. The conductive rod 118 is connected to the high potential terminal of a suitable source of high voltage electricity via conductor 122.

Within the casing 112 is a sleeve 168 provided with a plurality of struck or punched out serratures 170 to provide electrical discharge points for the electrode. The electrical discharge points materially improve the operation of the device particularly where the liquid to be decontaminated has a resistivity in the order of about $10^9$ to $10^{11}$ ohm-cm.

The sleeve 168 is constructed of electrically conductive material and is in electrical contact with the inner wall of the casing 112 whereby the electricity is conducted to the sleeve 168 by connecting the casing 112 to preferably the grounded terminal of the source of energizing voltage. In this form of the invention wherein the inner diameter of the casing 112 is about 1½ inches, a matrix having a diameter of 1 inch to provide approximately ¼ inch clearance between the outer surface of the matrix 130 and the inner wall of the casing provided satisfactory results. Serratures in the order of 1/16 or 3/32 of an inch projection have been found to provide good decontamination of high-resistivity fluids in the disclosed assembly.

As previously discussed, a plurality of the units illustrated in FIGS. 3 and 3A may be installed within a single housing in parallel and/or in series arrangement. Further, units of the type illustrated in FIGS. 3 and 3A may comprise one unit of a series flow decontaminator while the fine wire or rod-type units illustrated in FIGS. 1 and 1A or 2 and 2A may form the cleaning unit of the other of the serially arranged decontaminators.

Figure 4:
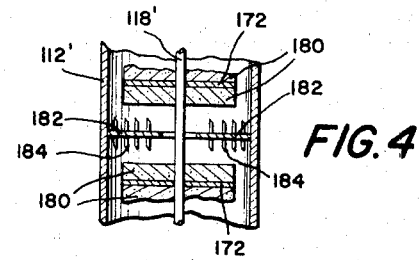
FIG. 4 is a fragmentary partial sectional view of still another form of the apparatus of the invention.

Referring to FIG. 4 of the drawings, a further form of the invention is illustrated which is also very useful in decontaminating high-resistivity liquids. In FIG. 4 a central electrode 118' is supported within the casing 112' and the central electrode 118' supports a plurality of electrically conductive cylindrical plates 172 secured to the rod 118' at spaced intervals. Each face of the discs 172 has secured thereto a cylindrical porous matrix member 180 and spaced intermediate the opposed faces of a pair of the porous matrix members 180 is a plurality of radially inwardly projecting plates 182, the outer ends of which are secured to the inner wall of the casing 112' or to a tubular insert therefor. Each of the plates 182 is provided with a plurality of needle-like pointed electrodes 184 which project toward their associated matrix medium. In this form of the invention, the fluid to be treated flows upwardly or downwardly through the casing 112' in a tortuous path about the outer surfaces of the matrix members 180 inwardly about the annular electrode plates 182, thence outwardly about the next upper or lower matrix members 180. Suitable dimensions for this form of the invention may be as follows:

|  | Inches |
|---|---|
| Spacing between discs 170 | 1½ |
| Spacing between annular electrodes 182 | 1½ |
| Thickness of matrix members 180 | ¼ |
| Length of projection of discharge needles 184, about | ¼ |

In this form of the invention, as in those previously described herein, the matrix members 180 are connected to the high voltage terminal of the power source through suitable conductors connected to the electrically conductive rod 118' while the conductive discs and needle point electrodes 182, 184 are connected to the grounded terminal of the power source.

Figure 5:
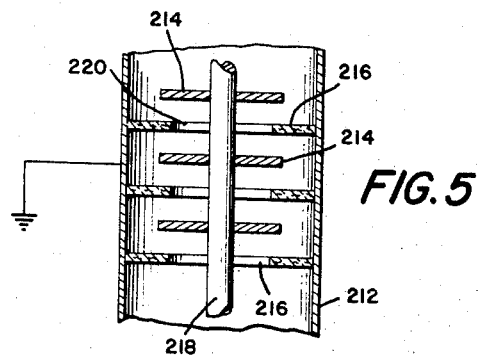
FIG. 5 is a fragmentary partial sectional view of a further form of the apparatus of the invention.

Referring to FIG. 5 of the drawings, a further form of the invention is illustrated which is also very useful in decontaminating high-resistivity liquids. In FIG. 5 a rod-like electrode 218 is supported centrally within the conductive casing 212. The central electrode 218 supports a plurality of spaced metal discs 214. The diameter of each of the discs 214 is less than the internal diameter of the casing 212 to thereby provide a passage for the flow of the liquid to be decontaminated between the outer edge of each of the discs and the inner surface of the casing 212.

Intermediate each of the metal discs 214 is positioned an annular fiberglass element 216. The fiberglass elements 216 are supported from the inner surface of the casing 212 and the diameter of the openings 220 in each of the fiberglass elements in relationship to the diameter of the central electrode 218 is such as to provide electrical clearance therebetween and a path for the flow of the liquid to be decontaminated.

In this form of the invention the central electrode 218 is connected to the grounded terminal of the energizing source while the metal casing 212 and its associated fiberglass annuli are connected to the high potential terminal. The sharp edges of the metal discs 214 function as points for corona discharge and in operation the decontaminating efficiency of the device shown in FIG. 5 is substantially equivalent to the forms of the invention shown in FIGS. 3, 3A and 4.

Figure 6:
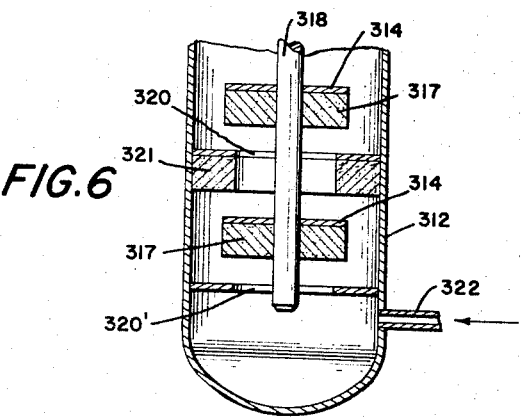
FIG. 6 is a fragmentary partial sectional view of a form of the apparatus similar to that shown in FIG. 5.

Referring to FIG. 6 of the drawings, a further form of the invention is illustrated which, like the forms illustrated in FIGS. 3, 3A, 4 and 5, is particularly suitable for decontaminating fluids having resistivities in the order of $10^9$ ohm-cm. and above. In FIG. 6 central electrode 318 supports a plurality of spaced metal discs 314. Each of the metal discs 314 has secured to one extended face thereof a porous matrix element 317.

The electrically conductive casing 312 supports a plurality of metallic annuli 320, each of which has secured to one extended surface an annular porous matrix element 321. As more clearly shown in the drawings, discs 314, matrices 317, metal annuli 320 and porous annuli 321 are so arranged that an exposed extended surface of each of the matrices is directed toward an uncovered surface of a complementary metal member. Thus, the lowermost metal annulus designated 320', adjacent the fluid inlet duct 322, is not provided with a porous element.

During operation of this form of the invention it has been found that both sets of porous elements 317 and 321 are effective collectors of the fluid contaminants.

Figure 7:
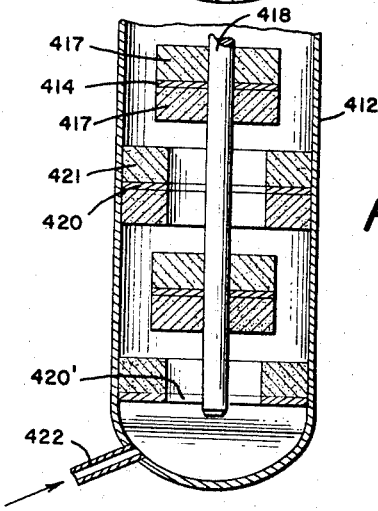
FIG. 7 is a fragmentary partial sectional view of still a further form of the apparatus of the invention.

In FIG. 7 a further form of the invention is illustrated which, like the forms illustrated in FIGS. 3 through 6, will effectively decontaminate high-resistivity fluids. In FIG. 7 the central electrode 418, which is connected to ground potential, supports a plurality of parallel, spaced, metal discs 414. Each of the metal discs 414 is provided with a porous matrix on each of its extended surfaces.

The electrically conductive casing 412 supports a plurality of parallel metal annuli 420. Metal annuli 420, like discs 414, each supports a porous annulus 421 on each of its extended surfaces except the lowermost annulus 420' which has only one matrix element secured thereto. Thus, as illustrated in FIG. 7, the extended surfaces of porous elements 417 and 421 oppose each other; however, it has been found that when the casing 412 is connected to the high potential terminal of the source of energizing electricity, the inner surface of the casing 412 together with the edges of the metal discs and annuli create electrostatic fields and turbulence in the fluid being treated to effectively drive the contaminants into the porous element.

Example 1

An oil commercially available under the trademark Oronite 8515 having a resistivity of $6.0 \times 10^9$ at applied voltages of about 40 kv. D.C./inch was contaminated with particles of +5 microns in size. The contaminated oil was passed through apparatus of the type illustrated in FIGS. 3 and 3A wherein the matrix was constructed of polyurethane foam porosity grade 45-80 p.p.i. The average voltage applied to the matrix and to the rod electrode 18 was in the order of 40 kv./inch average field strength. Over 99% of the contaminants were removed from the fluid in a single pass through the apparatus.

Example 2

An oil commercially available under the trademark Oronite 8200 having an electrical resistivity of about $1.9 \times 10^{10}$ was contaminated with particulate material in the +5 micron range. The oil was passed through apparatus of the type illustrated in FIG. 6 wherein the matrix medium comprised polyurethane foam porosity grade 45–80 p.p.i. An applied voltage of about 40 kv./inch field strength was maintained between the electrodes and +99% of the contaminating articulate material was removed from the oil in a single pass.

We claim:
1. Apparatus for separating contaminants from high resistivity liquids including:
  (a) an elongated casing formed of a conductive material and having a plurality of tooth-like points on the inside thereof and being radially inwardly directed,
  (b) a discharge electrode running lengthwise and interiorly of said casing element,
  (c) a porous matrix material affixed to the discharge electrode.
2. Apparatus for separating contaminants from high resistivity liquids including:
  (a) a generally elongated conductive casing,
  (b) a discharge electrode running lengthwise and interiorly of said casing,
  (c) a plurality of apertured conductive discs longitudinally spaced from each other and secured to the inside wall of the casing,
  (d) a plurality of conductive discs longitudinally spaced from each other and secured to the discharge electrode, and alternatingly interspersed with the first-mentioned plurality,
  (e) said second-mentioned discs each having a porous matrix material affixed to a side,
  (f) whereby a tortuous path is formed for a liquid flowing through the casing.
3. The apparatus of claim 2 wherein:
  (a) said first-mentioned discs having pointed electrodes on at least one side thereof,
  (b) said second-mentioned discs having a porous matrix material affixed to both sides of each.
4. The apparatus of claim 2 wherein:
  (a) said first mentioned discs having a porous matrix material affixed to a side of each homologous to the side of said second mentioned discs having the porous matrix material.
5. The apparatus of claim 2 wherein:
  (a) each of the discs of the first and second plurality is sandwiched between a porous matrix member.
6. Apparatus for separating contaminants from high resistivity liquids including:
  (a) a generally elongated conductive casing,
  (b) a discharge electrode running interiorly and lengthwise of said casing,
  (c) a plurality of apertured discs longitudinally spaced from each other and secured to the inside wall of said casing, said apertured discs being of a porous matrix material,
  (d) a plurality of conductive discs longitudinally spaced from each other and secured to said discharge electrode, and alternatingly interspersed with the first-mentioned plurality,
  (e) whereby a tortuous path is formed for a liquid flowing through the casing.

References Cited
UNITED STATES PATENTS

| | | | |
|---|---|---|---|
| 1,414,079 | 4/1922 | Giebner | 204—305 |
| 2,798,572 | 7/1957 | Fields | 204—302 |
| 3,190,827 | 6/1965 | Kok et al. | 204—302 |
| 3,252,884 | 5/1966 | Martin et al. | 204—305 |
| 3,252,885 | 5/1966 | Griswold | 204—302 |
| 3,324,026 | 6/1967 | Waterman et al. | 204—305 |

HOWARD S. WILLIAMS, *Primary Examiner.*

E. ZAGARELLA, *Assistant Examiner.*

U.S. Cl. X.R.

204—186, 299